July 19, 1960 — F. C. COREY ET AL — 2,945,257
POULTRY PROCESSING EQUIPMENT
Filed Feb. 7, 1957 — 4 Sheets-Sheet 1
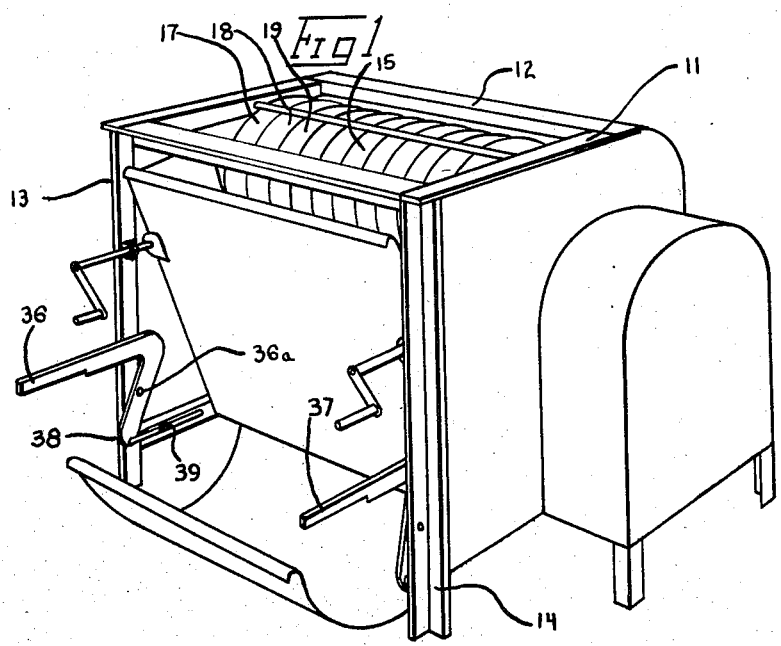
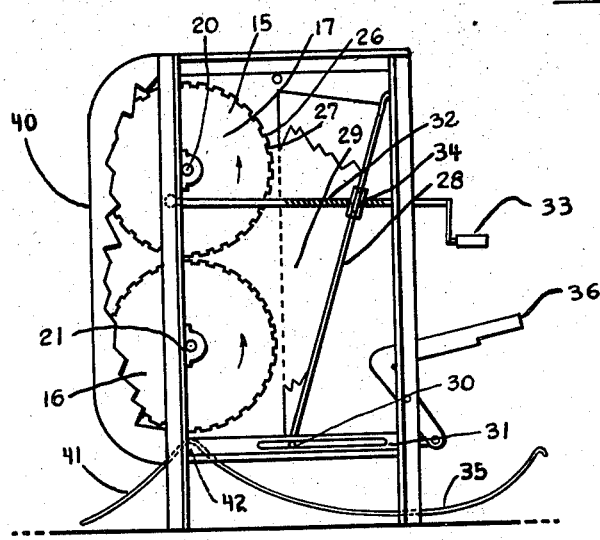
INVENTOR.
FREDERICK C. COREY
ROBERT D. PITTS
BY
Flournoy Corey
ATTy

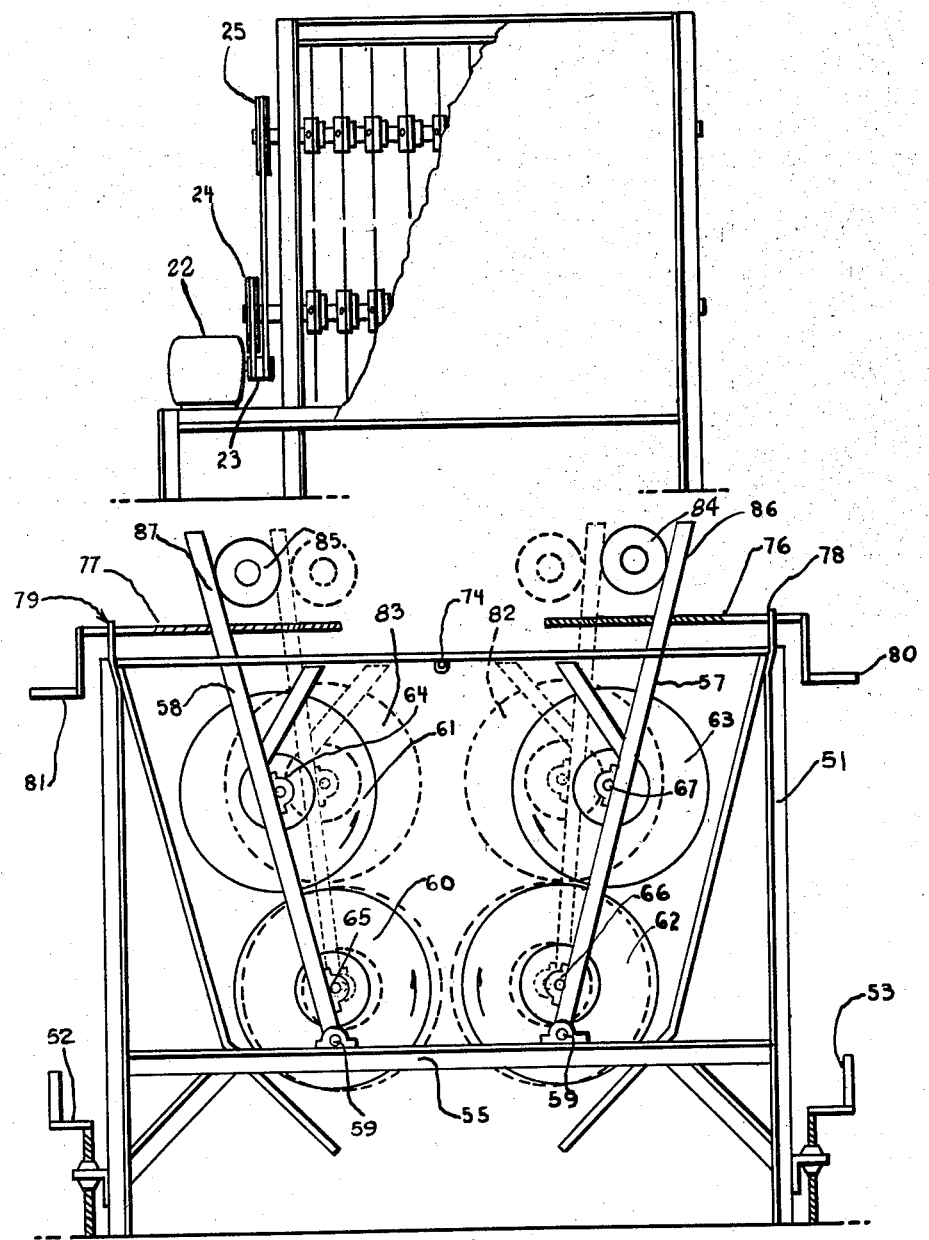

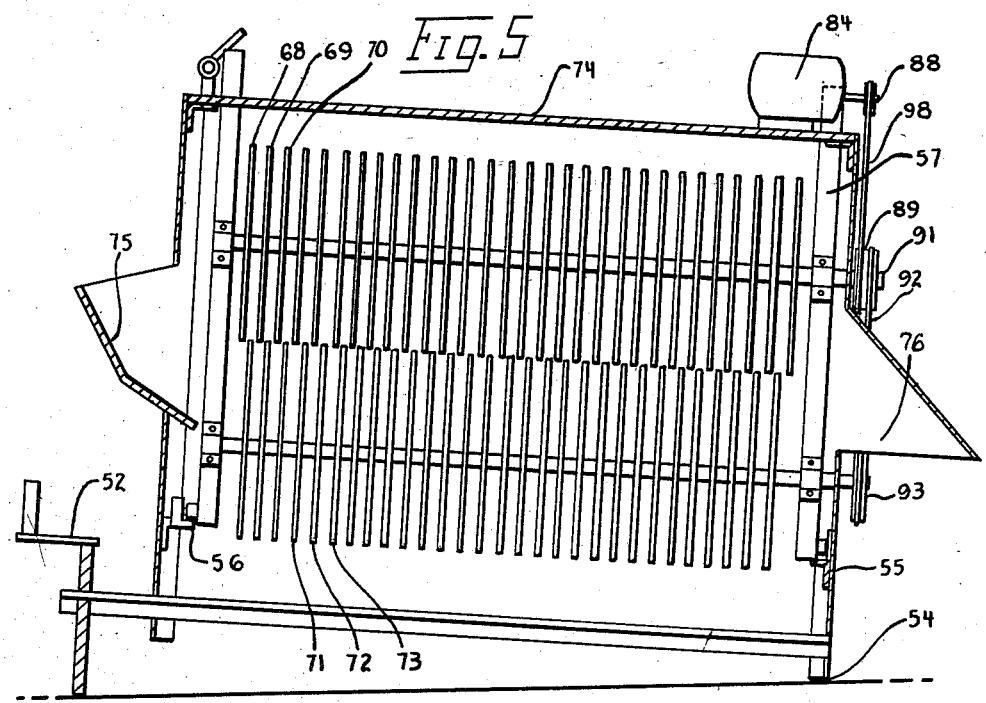
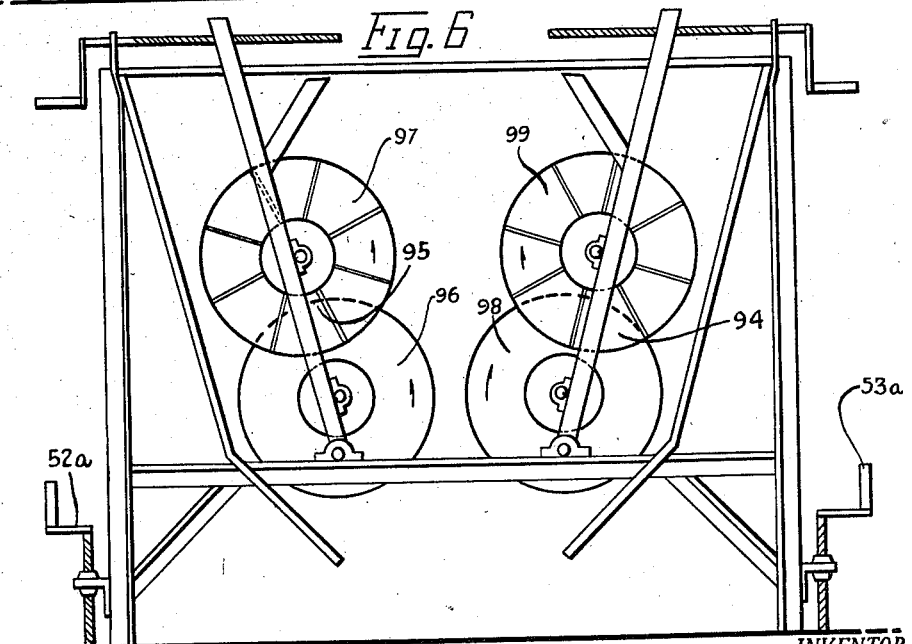

July 19, 1960  F. C. COREY ET AL  2,945,257
POULTRY PROCESSING EQUIPMENT
Filed Feb. 7, 1957  4 Sheets-Sheet 4

INVENTOR.
FREDERICK C. COREY
ROBERT D. PITTS.
BY
Flournoy Corey
ATTY

United States Patent Office 2,945,257
Patented July 19, 1960

2,945,257

POULTRY PROCESSING EQUIPMENT

Frederick C. Corey and Robert D. Pitts, Cedar Rapids, Iowa, assignors to Pickwick Company, Cedar Rapids, Iowa, a corporation of Iowa Filed Feb. 7, 1957, Ser. No. 638,864

3 Claims. (Cl. 17—11.1)

This invention concerns a poultry picker and more particularly one in which a plurality of discs will cause the removal of feathers from fowl and the like.

Numerous poultry pickers have been developed which will pick chickens and the like while they are confined in a working area without being held by either shackles or the human hands. However, these machines, for the most part, have employed the same type picking element which has been used historically to pick the held bird. These picking elements have usually consisted of an elongated, cylindrical finger much the size and shape of the human finger.

While these historic fingers will pick poultry effectively, they present considerable difficulty when the bird is not firmly held in some manner, in that the various impediments such as the legs, the wings, or the neck of the bird, will become lodged between two or three fingers with the result that the bird is damaged, either through abrasion to the skin or to a breakage of bones.

It is therefore a primary object of our invention to provide a device adapted to remove the feathers from various types of fowl, the fowl being loosely confined in an operating zone wherein the fowl can be tossed, tumbled and turned about therein to permit all surfaces of the bird and crevices to be brought into contact with picking elements.

It is another primary object of our invention to provide a picking element capable of removing the feathers from a loosely held bird in a confined area without such element delivering any damaging blows or presenting any considerable right angle face capable of causing breakage or the like.

It is yet another object of our invention to provide a device in which the area of confinement of the bird can be increased or decreased, both to accommodate the size of the bird and to regulate the intensity of the picking action.

It is yet another object of our invention to provide a device in which poultry can be moved from one picking surface to another and yet retained within an operating area and prevent it from being thrown completely out of the operating area.

It is still another object to provide a device in which the bird may be readily discharged from the operative area at the end of the picking cycle.

It is also a primary object of our invention to provide a device including picking elements which are adapted to reach into crevices in the bird, such as between the legs and underneath the wings, and remove feathers therefrom.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

In said drawings:

Figure 1 is a view in perspective of a machine constructed according to one embodiment of our invention.

Figure 2 is an end view of the machine at the end opposite to the motor, with the paneling partially removed or broken away to show the internal structure of the machine shown in Figure 1.

Figure 3 is a view in cross section of the machine shown in Figure 1 taken at a center line of the machine, a portion of the shield being cut away to show the arrangement of the picking elements.

Figure 4 is an end view of another embodiment of our invention in which two banks of picking elements are arranged side by side.

Figure 5 is a view in cross section of the machine shown in Figure 4, taken at the center line thereof, to show the arrangement of the picking element and also the means for introducing poultry into the machine and discharging it therefrom.

Figure 6 is an end view of a machine constructed in a manner similar to that of the machine shown in Figure 4, except that the picking elements are interlaced.

Figure 7:
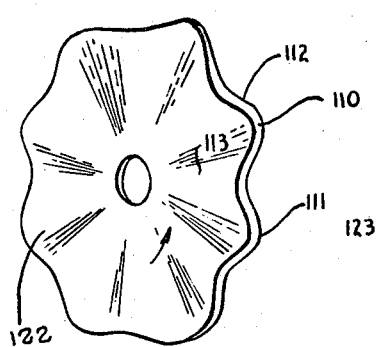
Figure 7 is a view in perspective of the single picking element which might be used in the machine shown in either Figures 1, 4 or 6.

Referring now to the drawings, and particularly Figure 1; the machine is constructed in a central box-like framework 11 which consists of the upper rectangular frame member 12, and the four supporting legs such as 13 and 14. Carried in this framework are a pair of substantially vertically mounted picking assemblies 15 and 16.

These picking assemblies 15 and 16 are comprised of a plurality of flexible discs such as 17, 18 and 19 which are preferably made of resilient material such as rubber. These discs are mounted on central shafts such as 20 and 21, the entire assembly forming a cylinder which may be driven by a motor 22, such as shown in Figure 3, through pulleys 23, 24 and 25. It will be noted that these two cylinders are mounted vertically one above the other and both turn in a counter-clockwise direction.

Figure 10:
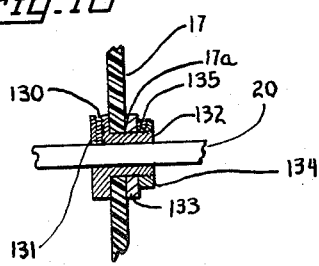
Figure 10 is an enlarged view with the parts in section of the hub assembly by which means the discs are held in position on the shaft.

The discs 20 and 21 are fixedly mounted on the shafts. This may be accomplished by the use of a collar mechanism such as shown in Figure 10. The disc 17 has an opening 17a which is slightly larger than the shaft 20. A collar 130 is attached to the shaft and held firmly in position by set screw 131. This collar has a sleeve 132 which extends along the shaft and has a threaded portion on the outer end thereof. The disc 17 slips over the sleeve. A second collar 133 is then placed on the sleeve and locked in position by a locknut 134. The locknut may of course be turned to the extent necessary to firmly grip the disc between the two opposed collars 130 and 133. A second set screw 135 may be tightened to hold the locknut firmly in position.

In the device shown in Figure 2, the individual discs, such as 17, are of a flexible material such as rubber and contain a plurality of notches such as 26 and 27 around the outer circumference.

Opposite these two vertically mounted cylinders is an angularly disposed shield 28. The operative zone within which the defeathering action takes place is between the two picking assemblies and this angular shield.

This operative area, indicated generally at 29, is preferably variable in size since the machine must defeather a wide variety of fowl from the one and two pound fryer up to the larger birds such as tom turkeys. In order to vary the size of this operating area, the angular shield is pivoted at its lower end on a pin 30 riding in a longitudinal slot 31. The mounting structure of this shield is shown in detail in Figure 2 and, of course, the same assembly exists at the opposite end of the machine. To regulate the pivotal movement of this angular shield, we have provided a threaded screw 32 and a crank 33 which is mounted at one end on the opposite side of the central framework 11. The threaded screw 32 is operatively connected to a large nut 34, which in turn is attached to the shield in such a manner that it will swivel in relation thereto. It will be apparent that by turning the crank, the shield can be moved toward or away from the two picking assemblies 16 and 17.

In operation, one or more birds are dropped downwardly through the rectangular frame 12 into the operating zone. Gravity carries them down toward the lower cylinder which is rotating in a counter-clockwise direction. This cylinder throws the individual bird upwardly in an arc about the cylinder to the point where it comes in contact with the upper cylinder, which is also moving in a counter-clockwise direction. Since the bird comes in contact with the underside of this upper cylinder, it is thrown away from the cylinder and toward the angular shield 28. Gravity again carries it down into contact with the lower cylinder and this cycle is repeated. It will be apparent that each time a bird comes in contact with either the upper or lower cylinder, a shearing or rubbing action takes place as between the picking element and the bird. The movement of the picking element, as against the dead weight of the bird, causes the feathers to be removed.

It will also be apparent that since the cylinders consist of a plurality of spaced discs, the wings, legs, and necks of the birds will frequently fall in between two adjacent discs, and in this way the crevices, such as under the wing and between the legs, will be reached by the notched portions on the circumference of the disc, with the result that the feathers located in these recesses will be removed.

When the feathers are removed from the bird, the birds are dropped out of the bottom of the machine into the trough 35. This is accomplished by sliding the pivot pin 30 along the length of the slot 31 to cause the lower end of the angular shield to be brought outwardly toward the outer framework of the machine. This movement can be secured by lifting the levers 36 and 37 in an upward direction. The two levers are pivoted about the pin, such as lever 36 about pin 36a, to cause the lower end 38 of the lever to move outwardly and through the medium of a connecting rod 39, which is attached to the end 30. Thus the shield is moved in the desired manner.

It will also be understood that the feathers removed from the fowl will drop downwardly from the two rotating cylinders and the picking elements thereon. Since the feathers have a tendency to cling to the defeathering elements, they are usually carried around the cylinder for a short distance, but ultimately centrifugal force causes them to be thrown outwardly from the cylinder. This action of separation will usually occur on the side opposite to the operating area. The feathers will fall downwardly along the back shield 40 and into a discharge chute 41. This results in the bulk of the feathers being separated from the birds which are dropped into the trough 35. This takes place since the chute and trough are made of one continuous piece, with a substantial ridge 42 immediately under the shafts 20 and 21 on which the cylinders are mounted.

This same method of operation, such as previously described, occurs in the embodiments shown in Figures 4 and 6. In this case, however, the machine is considerably larger in size, in that two vertical banks of picking cylinders and feather removing elements are provided. Referring to Figure 4, a framework 51 is provided which is of substantial length as shown in Figure 5. One end of the frame is provided with a pair of screw jacks 52 and 53 which permit the entire frame to be tilted around a pivot point 54 at the opposite end of the machine. This results in the picking cylinders being disposed at an angle to the horizontal for purposes which we will later set forth.

Mounted on the cross members 55 and 56 of the main frame are two substantially vertical upright carriages 57 and 58. These two carriages are pivoted on bearings such as 59 which are duplicated by similar bearings at the opposite end of the machine.

These upright pivoted carriage members are adapted to hold the picking cylinders which are mounted in vertically adjacent relation thereon. The carriage 58 holds the cylinders 60 and 61, whereas the carriage 57 holds the cylinders 62 and 63. These cylinders are mounted on the carriages by means of bearings 64 and 65 on one side, and bearings 66 and 67 on the other.

The arrangement of the cylinders is similar to that of the device shown in Figures 1, 2 and 3—that is, each pair of cylinders is vertically disposed in relation to each other and contain a series of individual discs such as 68, 69 and 70 in the top row of the machine, as shown in Figure 5, and 71, 72 and 73 as shown in the bottom cylinder of the machine shown in Figure 5. In this instance, the two cylinders on the left side of the machine, as shown in Figure 4, turn in a counter-clockwise direction, while those on the right side of the machine turn in an opposite or clockwise direction.

The operating zone of defeathering is in that area between the two opposed banks of cylinders and their respective picking elements. It will be apparent that a bird placed in this area, while the cylinders are rotating, will be tumbled from one picking element to another, the direction of throw from the lower cylinders being such that the bird contacts the upper cylinder on the under side and is thrown outwardly from the cylinder back into the defeathering area.

It has been found desirable to provide a continuous stream of water in this picking zone. This is accomplished through the medium of spray pipe 74 which is centered along the length of the machine over the picking zone.

As previously set forth, the entire framework of this embodiment of our device may be tilted around to pivot point 54 by the use of the screw jacks, such as 52a and 53a. The birds to be defeathered are introduced into the machine at the highest end of the machine through the chute 75, and this chute conveys the birds into the operating zone. Since the birds are free to be moved about and are subject to gravitational forces, and inasmuch as the banks of picking elements are sloped in relation to the horizontal, the birds tend to work their way downwardly at an angle between the opposed picking cylinders until they reach the lower end of the machine and the discharge opening 76. At this point they drop out of the machine and can be caught in any suitable conventional container.

It will be obvious that through the medium of the screw jacks 52 and 52a, the tilt of the machine can be regulated in relation to the horizontal, and that the higher the machine is lifted, the faster will be the movement of the birds down the slight incline produced and, conversely, the less the machine is tilted, the slower this movement will be. In this way, the picking time of the birds within the machine can be regulated to accommodate different sized birds and different finish requirements.

As in the machines shown in Figures 1, 2 and 3, the embodiment shown in Figure 4 also makes provision for the accommodation of different sized fowl. In the first described machine, this regulation of the size of the operating zone is achieved through the movement of the angular shield. In the device shown in Figure 4, the opposed picking cylinders may be moved pivotally back and forth toward and away from each other to increase or decrease the size of the picking zone.

To accomplish this movement, we have provided threaded screws 76 for the carriage 57, and 77 for the carriage 58. These screws are mounted on the main framework at 78 and 79 and are provided with cranks 80 and 81. By the turning of these cranks, the carriages can be moved inwardly to the position shown by the dotted line in Figure 4, the innermost position being 82 for the carriage 57 and 83 for the carriage 58.

To maintain a constant belt tension in view of this pivotal movement of the carriages, we mount the drive motors 84 and 85 on the upper end of the carriages at 86 and 87. The drive mechanism is shown in Figure 5. In this instance a pulley 88 drives a pulley 89 on the upper cylinder, through the medium of a belt 90, and in turn the upper cylinder drives the lower cylinder by means of pulleys 91, belt 92, and a second pulley on the lower cylinder 93.

In all forms of the invention, it is preferable that means be provided for preventing the hanging up of birds between the lower and upper defeathering elements. Since the weight of a bird against the lower element causes relatively more drag and more traction against this element, the upper defeathering assembly would not normally have sufficiently great enough traction to kick out the legs or wings or neck of a bird from between the two elements, if once drawn therebetween. To compensate for this, it is preferable that the defeathering discs in the lower picking assemblies be relatively smoother than those in the upper rotating defeathering drums. This may be accomplished by using smaller or fewer or eliminating the ribs or corrugations on the defeathering discs in the lower picking assemblies, as illustrated in Figure 6.

Figure 6 discloses a machine similar to that shown in Figure 4, with the exception of the fact that the two vertical banks of cylinders are interlaced at 94 and 95. In this embodiment, the direction of the movement of the cylinders 96 and 97 is counter-clockwise, and the cylinders 98 and 99 clockwise. By interlacing the cylinders, the effective picking area is reduced and the birds tend to be rolled more than when interlacing is less or not present. Less tossing of the bird will occur with interlacing. In all other respects, the operation of the machine shown in Figure 6 is substantially identical with that shown in Figures 4 and 5.

Figure 8:
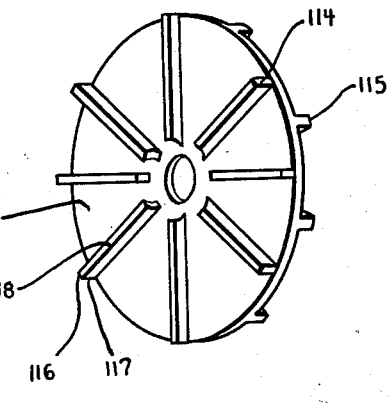
Figure 8 is a view in perspective of yet another form of picking element.
Figure 9:
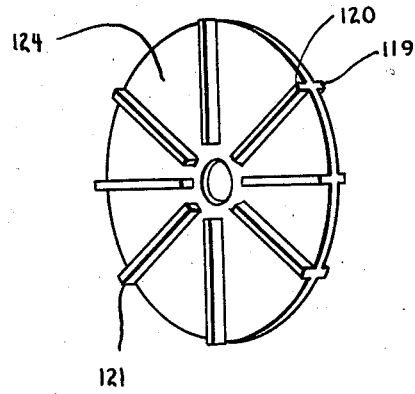
Figure 9 is a view in perspective of still another picking element.

Figures 7, 8 and 9 disclose other types of picking elements which may be used in either of the embodiments of the machine previously disclosed. In each instance, the individual disc is flexible in nature and may be formed of either plastic or rubber.

In Figure 7 the individual disc is formed with a series of radial corrugations, such as 110 and 111. A corrugated disc, such as this, results in angular edges 112 and 113 being presented to the fowl as the disc is moved in a counter-clockwise direction. This results in an intensified angular wiping action on the feathers and also, inasmuch as the picking element is flexible, permits these edges to tend to assume a variety of curved forms corresponding to the curved surfaces of the birds being picked.

Figure 8 again shows a disc formed of flexible material, but the disc carries a series of radial ridge members, such as 114, 115 and 116, which are on the opposite faces of the disc in a staggered relation to each other. Each of these ribs is preferably rectangular in shape and, therefore, presents two wiping edges 117 and 118 for the removal of feathers from a bird. Again, because of the flexible nature of these ribs, they can assume a slightly curved position which corresponds to the curvature of the body of the bird.

Figure 9 shows a structure similar to that shown in Figure 8, again employing a series of radial ribs 119, 120 and 121. But in this instance, the ribs on each face are exactly opposite each other and substantially strengthen the disc radially.

These various combinations are all equally effective in removing the feathers from fowl, but may be used in different commercial installations, depending on the type of fowl dressed therein. For example, the embodiment shown in Figure 7 is more adaptable to the dressing of light fryers and broilers, whereas the heavier form of Figure 9 is more applicable to heavy 20 to 30 pound tom turkeys where greater strength is required in the individual picking elements.

While we have described the operation of the various machines and the apparatus as it applies to an individual bird, it is apparent that the devices constructed according to our invention will accommodate a plurality of birds at one time, and that in this way the capacity of the machine is greatly increased over machines in which only one bird at a time may be picked.

Although we have described a specific embodiment of our invention it is apparent that modifications thereof may be made by those skilled in the art. Such modifications may be made without departing from the spirit and scope of our invention as set forth in the appended claims.

We claim as our invention:

1. A poultry picking device comprising a support, an upwardly inclined shield means on said support, at least one picking cylinder on said support adjacent said shield means, said cylinder having a substantially horizontal axis of rotation, the periphery of said cylinder being spaced from a lower portion of said shield means a distance less than the minimum dimension of the poultry being picked and said cylinder being rotatable with its periphery adjacent said shield means movable in an upward direction.

2. In a device as set forth in claim 1 including means mounted on said support and operatively connected to said shield means adapted to vary the angle of inclination of said shield means.

3. A poultry picking device comprising a support, an upwardly inclined shield means on said support, a picking cylinder on said support adjacent said adjacent lower portion of said shield means, said cylinder having a substantially horizontal axis of rotation, the periphery of said cylinder being spaced from the lower portion of said shield means a distance less than the minimum dimension of the poultry being picked, said cylinder being rotatable with its periphery adjacent said shield means movable in an upward direction, and a second picking cylinder having a horizontal axis of rotation positioned above said first cylinder adjacent the upper portion of said shield, said second cylinder being rotatable in the same direction as said first cylinder.

References Cited in the file of this patent

UNITED STATES PATENTS

| Number | Name | Date |
|---|---|---|
| 2,305,232 | Barker | Dec. 15, 1942 |
| 2,314,700 | Hanshaw | Mar. 23, 1943 |
| 2,376,120 | Campbell et al. | May 15, 1945 |
| 2,389,404 | Barker | Nov. 20, 1945 |
| 2,479,775 | Porter | Aug. 23, 1949 |
| 2,512,843 | Tomlinson | June 27, 1950 |
| 2,524,942 | Tomlinson | Oct. 10, 1950 |
| 2,599,621 | Fisher | June 10, 1952 |
| 2,634,456 | Toti | Apr. 14, 1953 |

FOREIGN PATENTS

| Number | Country | Date |
|---|---|---|
| 303,913 | Great Britain | Jan. 14, 1929 |
| 1,017,490 | France | Sept. 24, 1952 |